United States Patent
Gunaratna et al.

(10) Patent No.: US 12,354,022 B2
(45) Date of Patent: Jul. 8, 2025

(54) ON-DEVICE KNOWLEDGE EXTRACTION FROM VISUALLY RICH DOCUMENTS

(71) Applicant: SAMSUNG ELECTRONICS CO., LTD., Gyeonggi-Do (KR)

(72) Inventors: Dalkandura Arachchige Kalpa Shashika Silva Gunaratna, San Jose, CA (US); Vijay Srinivasan, San Jose, CA (US); Sandeep Nama, Santa Clara, CA (US); Christian Koehler, Sunnyvale, CA (US); Hongxia Jin, Cupertino, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 923 days.

(21) Appl. No.: 17/096,316

(22) Filed: Nov. 12, 2020

(65) Prior Publication Data

US 2022/0147843 A1 May 12, 2022

(51) Int. Cl.
*G06N 5/025* (2023.01)
*G06F 40/211* (2020.01)
(Continued)

(52) U.S. Cl.
CPC ........... *G06N 5/025* (2013.01); *G06F 40/211* (2020.01); *G06F 40/284* (2020.01); *G06N 7/01* (2023.01); *G06T 7/11* (2017.01); *H04N 19/176* (2014.11)

(58) Field of Classification Search
CPC ..... G06F 40/284; G06F 40/211; G06N 5/025; G06N 7/01; G06T 7/11; H04N 19/176
(Continued)

(56) References Cited

U.S. PATENT DOCUMENTS 6,456,738 B1 * 9/2002 Tsukasa ................. G06V 30/40
715/251
7,149,347 B1 * 12/2006 Wnek .................. G06V 30/416
382/209
(Continued)

FOREIGN PATENT DOCUMENTS

JP 2008052553 A1 3/2008
KR 101484419 B1 1/2015
(Continued)

OTHER PUBLICATIONS

Grishman, Ralph. "Information extraction: Capabilities and challenges." Notes prepared for the (2012). (Year: 2012).*
(Continued)

*Primary Examiner* — Thu V Huynh
(74) *Attorney, Agent, or Firm* — Kevin T. Cuenot

(57) ABSTRACT

Computer-based content understanding can include segmenting an image into a plurality of blocks, wherein each block includes textual information from the image. For each block of the plurality of blocks, encoded feature data is generated by encoding visual information of the block and visual information of one or more neighboring blocks from the plurality of blocks and encoded textual data is generated by encoding the textual information of the block and the textual information of the one or more neighboring blocks. Further, using an entity class prediction model, one or more tokens of the block are classified into one or more entity classes based on a combination of the encoded textual data and the encoded feature data. A plurality of entities can be extracted from the image based on the entity classes of the plurality of blocks.

20 Claims, 7 Drawing Sheets

(51) Int. Cl.
*G06F 40/284* (2020.01)
*G06N 7/01* (2023.01)
*G06T 7/11* (2017.01)
*H04N 19/176* (2014.01)

(58) Field of Classification Search
USPC .......................................................... 706/47
See application file for complete search history.

(56) References Cited

U.S. PATENT DOCUMENTS

| | | | |
|---|---|---|---|
| 9,256,795 B1 | 2/2016 | Gray et al. | |
| 9,298,981 B1* | 3/2016 | Ragnet | H04N 1/107 |
| 9,412,032 B2 | 8/2016 | Park et al. | |
| 9,830,508 B1* | 11/2017 | Winder | G06V 10/28 |
| 10,572,725 B1* | 2/2020 | Becker | G06F 18/2413 |
| 10,867,171 B1* | 12/2020 | Contryman | G06V 10/242 |
| 10,872,236 B1* | 12/2020 | Elor | G06V 30/1452 |
| 10,949,661 B2* | 3/2021 | Bhotika | G06V 30/412 |
| 10,956,673 B1* | 3/2021 | Ramezani | G06V 30/416 |
| 11,163,374 B2 | 11/2021 | Gralewicz | |
| 11,393,233 B2* | 7/2022 | Tata | G06N 20/00 |
| 2004/0013302 A1* | 1/2004 | Ma | G06V 30/414 382/209 |
| 2004/0145593 A1 | 7/2004 | Berkner et al. | |
| 2006/0190489 A1* | 8/2006 | Vohariwatt | G06Q 10/00 |
| 2007/0118391 A1* | 5/2007 | Malaney | G06Q 10/00 382/229 |
| 2008/0175476 A1* | 7/2008 | Ohk | H04N 1/41 382/176 |
| 2009/0116736 A1* | 5/2009 | Neogi | G06V 30/40 382/159 |
| 2010/0284623 A1* | 11/2010 | Chen | G06V 30/414 382/224 |
| 2015/0093021 A1* | 4/2015 | Xu | G06V 30/412 382/159 |
| 2016/0026899 A1 | 1/2016 | Wang et al. | |
| 2016/0196350 A1* | 7/2016 | Mau | G06T 5/70 707/706 |
| 2016/0275374 A1* | 9/2016 | Zhu | G06V 10/764 |
| 2016/0358338 A1 | 12/2016 | Tsunoda | |
| 2017/0091545 A1* | 3/2017 | Adachi | G06V 30/1983 |
| 2017/0109610 A1* | 4/2017 | Macciola | G06F 16/93 |
| 2017/0206409 A1* | 7/2017 | Bataller | G06V 30/413 |
| 2018/0373791 A1* | 12/2018 | Yen | G09B 7/04 |
| 2019/0050639 A1* | 2/2019 | Ast | G06V 10/82 |
| 2019/0050640 A1* | 2/2019 | Sarkar | G06N 3/044 |
| 2019/0220660 A1* | 7/2019 | Cali | G06V 30/40 |
| 2019/0286691 A1* | 9/2019 | Sodhani | G06F 40/216 |
| 2019/0303663 A1* | 10/2019 | Krishnapura Subbaraya | G06V 30/413 |
| 2019/0303727 A1* | 10/2019 | Foroughi | G06N 7/01 |
| 2020/0012876 A1* | 1/2020 | Liu | G06F 18/214 |
| 2020/0111023 A1* | 4/2020 | Pondicherry Murugappan | G06N 5/02 |
| 2020/0160050 A1* | 5/2020 | Bhotika | G06V 30/414 |
| 2020/0226364 A1 | 7/2020 | Gehler et al. | |
| 2020/0250417 A1* | 8/2020 | Torres | G06V 30/19173 |
| 2020/0294267 A1* | 9/2020 | Zhang | G06V 20/10 |
| 2020/0371723 A1* | 11/2020 | Morales | H04N 1/00411 |
| 2021/0012102 A1* | 1/2021 | Cristescu | G06F 40/284 |
| 2021/0012103 A1* | 1/2021 | Bassu | G06F 16/288 |
| 2021/0034853 A1* | 2/2021 | Matsumoto | G06V 30/413 |
| 2021/0097272 A1* | 4/2021 | Shimizu | G06F 18/22 |
| 2021/0295101 A1* | 9/2021 | Tang | G06V 30/412 |
| 2021/0334664 A1* | 10/2021 | Li | G06V 20/20 |
| 2021/0374395 A1* | 12/2021 | Tata | G06V 30/416 |
| 2022/0036063 A1* | 2/2022 | Bhuyan | G06V 30/416 |
| 2022/0121821 A1* | 4/2022 | Yaramada | G06V 30/19007 |
| 2022/0319219 A1* | 10/2022 | Tsibulevskiy | G06V 30/226 |

FOREIGN PATENT DOCUMENTS

| | | |
|---|---|---|
| WO | 201921648 A1 | 11/2019 |
| WO | 2022103179 A1 | 5/2022 |

OTHER PUBLICATIONS

Liu, Yinhan, Myle Ott, Naman Goyal, Jingfei Du, Mandar Joshi, Danqi Chen, Omer Levy, Mike Lewis, Luke Zettlemoyer, and Veselin Stoyanov. "Roberta: A robustly optimized bert pretraining approach." arXiv preprint arXiv:1907.11692 (2019). (Year: 2019).*

Rusinol, Marçal, Tayeb Benkhelfallah, and Vincent Poulain dAndecy. "Field extraction from administrative documents by incremental structural templates." In 2013 12th International Conference on Document Analysis and Recognition, pp. 1100-1104. IEEE, 2013. (Year: 2013).*

Nor, Danial & Omar, Rosli & Jenu, Mohd & Ogier, Jean-Marc. (2011). Application to the extraction of textual information in scene images. (Year: 2011).*

V. Rajan and S. Raj, "Text detection and character extraction in natural scene images using fractional poisson model," 2017 International Conference on Computing Methodologies and Communication (ICCMC), Erode, India, 2017, pp. 1136-1141 (Year: 2017).*

Kumar, Deepak & Ramakrishnan, A.G . . . (2014). Methods for text segmentation from scene images. ELCVIA Electronic Letters on Computer Vision and Image Analysis. 13. 32. (Year: 2014).*

Selva Kumari, R.Shantha & Sangeetha, R . . . (2015). Optical character recognition for document and newspaper. International Journal of Applied Engineering Research. 10. 15279-15285. (Year: 2015).*

N. Nathiya and K. Pradeepa, "Optical Character Recognition for scene text detection, mining and recognition," 2013 IEEE International Conference on Computational Intelligence and Computing Research, Enathi, India, 2013, pp. 1-4. (Year: 2013).*

Li et al.,"Enhancing Visually-Rich Document Understanding via Layout Structure Modeling," ACM, 2023, pp. 4513-4523. (Year: 2023).*

Liu, X. et al., "Graph Convolution for Multimodal Information Extraction from Visually Rich Documents," arXiv preprint: arXiv:1903.11279, Mar. 27, 2019, 8 pg.

Xu, Y. et al., "LayoutLM: Pre-training of Text and Layout for Document Image Understanding," In Proceedings of the 26th ACM SIGKDD International Conference on Knowledge Discovery & Data Mining, Aug. 23, 2020, pp. 1192-1200.

Wei, M. et al., "Robust Layout-aware IE for Visually Rich Documents with Pre-trained Language Models," arXiv preprint: arXiv:2005.11017, May 22, 2020, 10 pg.

Sarkhel, R. et al., "Visual Segmentation for Information Extraction from Heterogeneous Visually Rich Documents," In Proceedings of the 2019 International Conference on Management of Data, Jun. 2019, (pp. 247-262).

WO Appln. PCT/KR2021/016465, International Search Report and Written Opinion, 8 pg. Feb. 25, 2022.

* cited by examiner

600

```
┌─────────────────────────────────────────────────────────────────┐
│                  Retrieve an image from a memory                │
│                               602                               │
└─────────────────────────────────────────────────────────────────┘
                                 │
┌─────────────────────────────────────────────────────────────────┐
│ Segment the image into a plurality of blocks, wherein each block│
│   includes textual information and visual information from the │
│                              image                              │
│                               604                               │
└─────────────────────────────────────────────────────────────────┘
                                 │
┌─────────────────────────────────────────────────────────────────┐
│   Optionally determine domain for image and determine domain    │
│                          specific data                          │
│                               606                               │
└─────────────────────────────────────────────────────────────────┘
                                 │
┌─────────────────────────────────────────────────────────────────┐
│ Generate encoded feature data by encoding the visual information│
│  of the block and the visual information of one or more         │
│         neighboring blocks from the plurality of blocks         │
│                               608                               │
└─────────────────────────────────────────────────────────────────┘
                                 │
┌─────────────────────────────────────────────────────────────────┐
│ Generate encoded textual data by encoding the textual           │
│ information of the block and the textual information of the one │
│                    or more neighboring blocks                   │
│                               610                               │
└─────────────────────────────────────────────────────────────────┘
                                 │
┌─────────────────────────────────────────────────────────────────┐
│ Classify, using an entity class prediction model, the block into│
│  one or more entity classes based on a combination of the       │
│            encoded textual data and the encoded feature data    │
│                               612                               │
└─────────────────────────────────────────────────────────────────┘
                                 │
┌─────────────────────────────────────────────────────────────────┐
│ Extract a plurality of entities from the image based on the     │
│           entity classes of the plurality of blocks             │
│                               614                               │
└─────────────────────────────────────────────────────────────────┘
```

FIG. 6

ON-DEVICE KNOWLEDGE EXTRACTION FROM VISUALLY RICH DOCUMENTS

TECHNICAL FIELD

This disclosure relates to knowledge extraction from an unstructured data source and, more particularly, to knowledge extraction from a visually rich document performed locally on an electronic device.

BACKGROUND

Knowledge extraction refers to creating knowledge, or information, from structured data sources and/or unstructured data sources. Examples of structured data sources include relational databases and markup language documents. Examples of unstructured data sources include text (e.g., free form), documents, and/or images. Extracting knowledge from an unstructured data source such as an image typically involves processing the unstructured data source through a computer-based model that requires significant computational resources for execution. Due to the computational resources required, knowledge extraction systems are often implemented as server-based and/or cloud-based systems that are accessed by remote client devices.

Accordingly, for a user of an edge device such as a mobile phone to use knowledge extraction to process an unstructured data source, the edge device must share the unstructured data source with a remotely located knowledge extraction system. Any knowledge extracted from the unstructured data source is sent back to the edge device. This means that potentially sensitive information such as the unstructured data source itself and/or the knowledge extracted from the unstructured data source may be stored on the remote system and also transmitted over public communication channels, thereby rendering the data vulnerable to attack by nefarious third parties.

SUMMARY

In an example implementation, a computer-based method for understanding content from images may include segmenting an image into a plurality of blocks, wherein each block includes textual information from the image. For each block of the plurality of blocks, the method may include generating encoded feature data by encoding visual information of the block and visual information of one or more neighboring blocks from the plurality of blocks, generating encoded textual data by encoding the textual information of the block and the textual information of the one or more neighboring blocks, and classifying, using an entity class prediction model, one or more tokens of the block into one or more entity classes based on a combination of the encoded textual data and the encoded feature data. The method may include extracting a plurality of entities from the image based on the entity classes of the plurality of blocks.

In another example implementation, a system for understanding content from images includes a processor configured to initiate operations. The operations may include segmenting an image into a plurality of blocks, wherein each block includes textual information from the image. For each block of the plurality of blocks, the operations may include generating encoded feature data by encoding visual information of the block and visual information of one or more neighboring blocks from the plurality of blocks, generating encoded textual data by encoding the textual information of the block and the textual information of the one or more neighboring blocks, and classifying, using an entity class prediction model, one or more tokens of the block into one or more entity classes based on a combination of the encoded textual data and the encoded feature data. The operations may include extracting a plurality of entities from the image based on the entity classes of the plurality of blocks.

In another example implementation, a computer program product includes one or more computer readable storage media, and program instructions collectively stored on the one or more computer readable storage media. The program instructions are executable by computer hardware to initiate operations. The operations may include segmenting an image into a plurality of blocks, wherein each block includes textual information from the image. For each block of the plurality of blocks, the operations may include generating encoded feature data by encoding visual information of the block and visual information of one or more neighboring blocks from the plurality of blocks, generating encoded textual data by encoding the textual information of the block and the textual information of the one or more neighboring blocks, and classifying, using an entity class prediction model, one or more tokens of the block into one or more entity classes based on a combination of the encoded textual data and the encoded feature data. The operations may include extracting a plurality of entities from the image based on the entity classes of the plurality of blocks.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates an example method of knowledge extraction from an unstructured data source.

DETAILED DESCRIPTION

Figure 1:
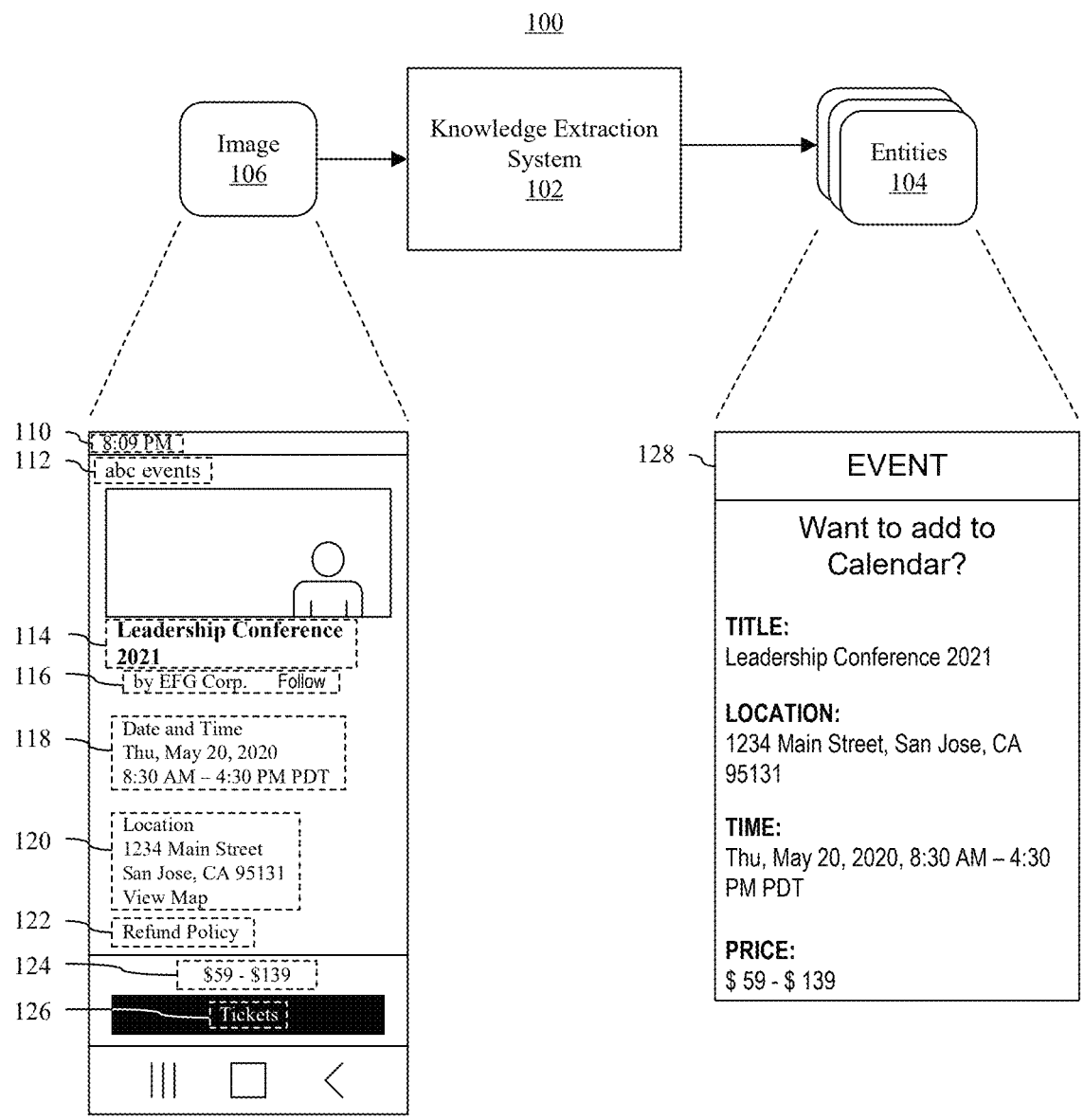
FIG. 1 illustrates an example knowledge extraction system configured to extract knowledge from an unstructured data source.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to knowledge extraction from an unstructured data source and, more particularly, to knowledge extraction from a visually rich document performed locally on an electronic device. Available systems capable of extracting knowledge from unstructured data sources are typically implemented using powerful computing systems such as servers and/or cloud computing nodes that are equipped with significant computational resources in terms of processor power and/or memory. While a user using an edge device may access these remote knowledge extraction systems, such access requires the sharing of potentially sensitive or personal information.

In accordance with the inventive arrangements described within this disclosure, example methods, systems, and computer program products are provided that are capable of extracting knowledge from unstructured data sources. The example implementations described herein may be implemented locally on an edge device. Accordingly, the edge device may perform knowledge extraction from unstructured data sources using only processing capabilities and resources (e.g., processor and/or memory) within the device itself without having to rely on or access any remote systems. The entirety of the knowledge extraction operations may be performed locally on the edge device. As defined within this disclosure, the term "edge device" means a portable computing device. Examples of edge devices include, but are not limited to, a mobile phone, a smart phone, a handheld computing device, and a wearable computing device such as a smart-watch or smart glasses.

In one or more example implementations, the unstructured data source may be a visually rich document. Visually rich documents are characterized as having a mixture of visual elements, e.g., graphics, and text. The text may be stylized text. Further, visually rich documents tend to have more of a graphical layout than other documents or data sources. The text of visually rich documents tends to be more sparse than other text sources. For example, the text of a visually rich document is not usually specified in grammatically correct or well-formed sentences, but rather in smaller portions or bits such as phrases or groupings of one or more words. Examples of visually rich documents may include, but are not limited to, posters, banners, playbills, menus, receipts, and travel itineraries. Visually rich documents may be embodied as images, possibly captured by the edge device.

The edge device, in implementing a knowledge extraction system locally therein, is capable of processing an image of a visually rich document to detect and recognize one or more entities contained in the image. The entities may originate from text recognized in the image by the edge device. The edge device further may determine classes for the recognized entities thereby allowing the entities to be stored and/or used for other purposes. Once processed, the edge device may transfer the extracted entities to another application. For example, the edge device may automatically create an event based on the entities. The edge device may automatically add details (e.g., parameters or attributes) such as a title, a location, a time, a price, an organizer, email, a performer, and/or a URL to the event in a calendar application of the user that executes on the edge device. The details that are added may be the extracted entities.

In one or more example implementations, the edge device, in implementing the knowledge extraction system locally therein, is capable of processing the image to determine the domain, from a plurality of different domains, to which the image belongs. Each domain, for example, may indicate or correspond to a particular type of visually rich document. Each of the domains may be associated with domain-specific data. Examples of domain-specific data include, but are not limited to, parameters, models, and/or rules. The edge device uses the domain-specific data in extracting the entities. The edge device is capable of loading the domain-specific data in response to determining the domain of the image. As such, the edge device need only maintain the selected domain-specific data in runtime memory for purposes of processing the image. Unused domain-specific data may remain stored in non-volatile memory (e.g., memory not used for runtime operation). This capability means that fewer computational resources, e.g., runtime memory, are needed to implement the knowledge extraction system.

In another aspect, the edge device is capable of performing certain knowledge extraction operations in parallel. For example, the edge device, in implementing the knowledge extraction system, is capable of processing the image using a local neighborhood approach to be described herein in greater detail below. By creating and processing a plurality of local neighborhoods formed from the image, as opposed to using a global approach, the different local neighborhoods may be processed independently, in parallel (e.g., concurrently). By comparison, a global approach to processing the image prevents parallelism as the different portions of the image being processed are interdependent. The parallel processing implemented by the inventive arrangements described herein helps to increase processing speed and reduce system latency.

The inventive arrangements described within this disclosure are capable of operating on the edge device with low latency and with low runtime memory consumption while also maintaining a high degree of accuracy. This allows the example knowledge extraction system(s) described within this disclosure to run entirely on an edge device. The edge device need not access any other remote system or device to perform knowledge extraction on a visually rich document. Further, the knowledge extraction performed may be fine-grained.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example knowledge extraction system 102 configured to extract knowledge from an unstructured data source. Knowledge extraction system 102 may be implemented within a device 100. Device 100 may be an edge device. An example implementation of device 100 is described herein in connection with FIG. 7. Knowledge extraction system 102 may be implemented in hardware, e.g., as dedicated circuitry; program code executed by one or more processors; or a combination thereof. Knowledge extraction system 102 is capable of executing entirely within device 100. That is, knowledge extraction system 102 is capable of performing the various operations described within this disclosure without accessing or contacting another system or device external to device 100 such as a server, cloud computing node, or other data processing system. In this regard, knowledge extraction system 102 is said to execute locally on device 100.

In the example of FIG. 1, knowledge extraction system 102 processes a visually rich document embodied as image 106. Image 106 may be embodied as a data structure such as a digital file stored in a memory of device 100. For example, image 106 may be stored as a JPEG file, a PNG file, or other suitable file. In the example of FIG. 1, image 106 is a screen shot. Image 106 may have been taken or captured using device 100. In other examples, image 106 may be captured by a camera included in device 100. Image 106 may also have been generated, at least initially, by another device and forwarded to device 100. In any case, image 106 is a representation or visualization of a visually rich document.

For purposes of illustration, image 106 includes a plurality of different portions of text 110, 112, 114, 116, 118, 120, 122, 124, and 126. In the example of FIG. 1, knowledge extraction system 102 is capable of detecting the portions of text from image 106. Knowledge extraction system 102 is capable of classifying the portions of text as particular entities 104 (e.g., classified entities) that are extracted from image 106. The term "extraction," as used herein, means detecting and recognizing data from an image such that the data may be stored in a data structure independently from the data source (e.g., image). In the example of FIG. 1, the data that is extracted are entities 104 having classifications. Entities 104 may be stored in a data structure independently from image 106.

For purposes of illustration, device 100 is capable of presenting entities 104 organized in view 128 asking the user whether to create an event within a calendar application of device 100. The event may be created based on, or using, one or more of entities 104 as extracted from image 106. In creating the event, the user need not manually copy or input the event and/or event details into the calendar application as the event and/or event details are derived from entities 104. Further, device 100 has automatically determined that entities 104 likely correspond to an event that may be created in the calendar application causing device 100 to automatically generate and present view 128.

Figure 2:
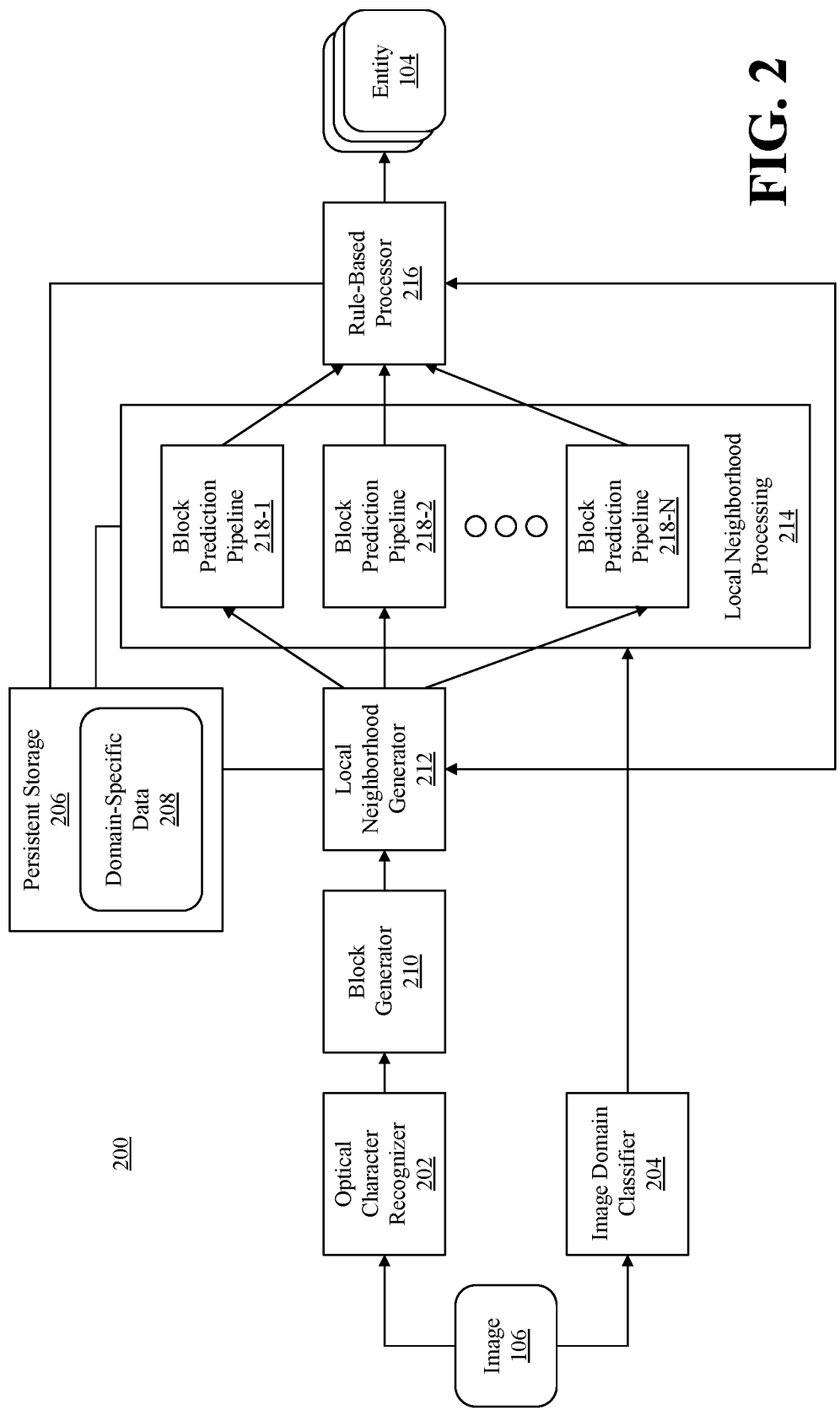
FIG. 2 illustrates an example architecture for a knowledge extraction system configured to extract knowledge from an unstructured data source.

FIG. 2 illustrates an example architecture 200 for a knowledge extraction system configured to extract knowledge from an unstructured data source. Architecture 200 may be used to implement knowledge extraction system 102 of FIG. 1. In an example implementation, architecture 200 may be implemented in hardware, e.g., as dedicated circuitry; as program code executed by one or more processors; or a combination thereof.

In the example of FIG. 2, image 106 may be retrieved from a memory, e.g., from non-volatile memory, of device 100 and loaded into runtime memory. Image 106 may be provided to optical character recognizer 202 and to image domain classifier 204. In one or more example implementations, optical character recognizer 202 and image domain classifier 204 may operate in parallel, e.g., concurrently.

Optical character recognizer 202 is capable of detecting and recognizing portions of text that are embedded or included in image 106. For example, optical character recognizer 202 is capable of recognizing the text 110-126 of image 106 illustrated in FIG. 1.

Image domain classifier 204 is capable of processing image 106 and classifying image 106 into one of a plurality of different domains of visually rich documents. Examples of different domains include the different types of visually rich documents previously described. Examples of different domains into which image 106 may be classified can include, but are not limited to, poster, banner, playbill, menu, receipt, and travel itinerary. Image domain classifier 204 is capable of detecting high-level features of image 106 and determining the particular domain to which image 106 belongs based on the detected high-level features. In one or more example implementations, image domain classifier 204 may be implemented as a neural network that has been pretrained to classify images into different domains of visually rich documents.

Persistent storage 206 of architecture 200 is capable of storing domain-specific data 208. Examples of domain-specific data include, but are not limited to, domain-specific parameters, models, and/or rules. That is, persistent storage 206 stores domain-specific data for each domain that is recognizable by image domain classifier 204. Different components of architecture 200 are capable of retrieving relevant portions of domain-specific data 208 for processing image 106 based on the particular domain for image 106 that is determined by image domain classifier 204. The parameter(s) for each domain may be predetermined parameter value(s); the model(s) for each domain may be pretrained model(s); and, the rule(s) for each domain may be predetermined rule(s).

For example, the resulting domain of image 106, as determined by image domain classifier 204, may be provided to one or more other components of architecture 200. In the example of FIG. 2, image domain classifier 204 is capable of providing the determined domain to local neighborhood generator 212, local neighborhood processing 214, and rule-based processor 216. Each of these components is capable of retrieving the portion(s) of domain-specific data 208 for the determined domain and specific to each respective component from persistent storage 206. The components are capable of loading the relevant portion(s) of data from persistent storage 206 into runtime memory for use in processing image 106 or portions thereof. The term "runtime memory" refers to random-access memory (RAM) or other memory used during actual execution of program code. This capability allows device 100 to store different parameter(s), model(s), and/or rule(s) specific to particular domains of visually rich documents and specific to particular components of architecture 200, in persistent, or long term, storage. Only the domain-specific parameter(s), model(s), and/or rule(s) needed for processing image 106 are loaded into runtime memory of device 100. This reduces the amount of memory that is required to execute architecture 200.

Block generator 210 is capable of receiving image 106 with text having been recognized therein by optical character recognizer 202. Block generator 210 is capable of generating a plurality of blocks corresponding to the text recognized in image 106. In one aspect, each block includes a portion of text from image 106. Each block may also include a sub-image, which is a region of image 106 that includes the subject text. The sub-image, for example, may be a cropped portion of image 106 that includes the text of the block. For purposes of illustration, block generator 210 may process image 106 and generate a plurality of blocks corresponding to the portions of text 110-126 of FIG. 1. Each sub-image of a block, for example, may be the portion of image 106 that is the same as, or corresponds to, the dashed bounding box of the respective text 110, 112, 114, 116, 118, 120, 122, 124, and 126 illustrated in FIG. 1. Each block may include textual information and additional visual information.

In one or more example implementations, block generator 210 is capable of performing block merge operations in response to determining that two blocks are related. For example, in creating blocks, block generator 210 is capable of including location and size information in each block. The location indicates the location of the block in image 106. The location may be specified as an (x, y) coordinate for the block center. The size information may specify length and width of the block (e.g., in pixels). It should be appreciated that such information may be specified using other techniques such as by providing or specifying coordinates of opposing corners of the block (e.g., top left-bottom right; or top right-bottom left). Accordingly, block generator 210 is capable of merging two or more blocks into a single, larger block in response to determining that the blocks are within a predetermined distance of one another. This allows blocks that include portions of text that may be related (e.g., individual text tokens of an address) to be combined into a single, larger block that includes multiple tokens corresponding to an address. As an illustrative and non-limiting example, block generator 210 may initially identify the following as 4 separate blocks where ' ' are used to demarcate between the blocks: 'location' '1234 Main Street' 'San Jose, CA 95131' 'View Map'. Block generator 210 may combine these individual blocks into a single larger block corresponding to text 120.

Local neighborhood generator 212 is capable of grouping the blocks into local neighborhoods that are provided to local neighborhood processing 214. For example, local neighborhood generator 212 is capable of generating a local neighborhood for each block created from image 106. Each local neighborhood includes a current block and one or more neighbor blocks. In one aspect, the parameter(s) that dictate the number of neighbor blocks in a local neighborhood and/or the size of each local neighborhood may be domain-specific and retrieved by local neighborhood generator 212 from domain-specific data 208. Thus, local neighborhood formation, as performed by local neighborhood generator 212, may vary based on the particular domain to which image 106 belongs as determined by image domain classifier 204.

Local neighborhood processing 214 includes a plurality of parallel processing pipelines illustrated as block prediction pipelines 218 in FIG. 2. In one aspect, local neighborhood processing 214 is capable of instantiating N different block prediction pipelines, where N is equal to the number of blocks and, as such, local neighborhoods, to be processed. Referring to the example of FIG. 1 where 9 different blocks are identified, N may be set equal to 9. Block prediction pipelines 218 are capable of operating in parallel to process the N local neighborhoods concurrently.

In one or more example implementations, each block prediction pipeline 218 may include a plurality of models. The models may be configured to encode data and to perform entity prediction. Each of the models implemented in block prediction pipeline 218 may be domain-specific.

Each block prediction pipeline 218 processes one local neighborhood to generate a feature vector with probabilities that sum to 1. Each probability of the feature vector indicates the likelihood that a token in a block corresponds to a particular entity class. Examples of different entity classes include, but are not limited to, title, date, price, location, time, and URL (in addition, by default, O-tag represents tokens that do not belong to any of the predefined classes like title, date, price, etc.). In the example of FIG. 2, each block prediction pipeline 218 outputs the entity class with the highest probability of the feature vector for the local neighborhood that was processed. The entity class determined by each block prediction pipeline 218 is provided to rule-based processor 216.

Rule-based processor 216 is capable of applying one or more domain-specific rules to entity recognition results generated by local neighborhood processing 214 to improve entity class prediction accuracy. Rule-based processor 216 incorporates learned domain-specific knowledge (e.g., domain-specific rule inferencing) into the entity extraction process. As noted, in one aspect, each block prediction pipeline 218 may output the block operated on along with the entity class for the block having the highest probability. In some cases, a block prediction pipeline may not determine an entity class for a token. In such cases, the block prediction pipeline determines that the token is an O-tag, meaning that the token has been interpreted to be an irrelevant token that has not been classified into any particular entity class.

In accordance with the inventive arrangements described herein, rule-based processor 216 is capable of applying one or more domain-specific rules to increase entity classification accuracy. Consider the case where the domain for image 106 is "poster." The domain-specific rules for "poster" may indicate the particular entity classes that should be determined for such a visually rich document. An example domain-specific rule may specify that in cases where the domain is "poster" and the title entity class is empty, e.g., no block prediction pipeline has output a text block with the entity class of "title," rule-based processor 216 selects the token of a block having an O-tag with the highest probability of being the title entity class. Rule-based processor 216 uses the token as the title entity class for image 106. As another example, if the domain of image 106 is "travel itinerary," an example rule may be: if trip type=round trip and return date=empty, set the return date to the token with an O-tag having the highest return date probability.

Thus, the domain-specific rules applied by rule-based processor 216 may be generalized as follows: for a given domain D and poster (e.g., image) P, if the rules indicate that an essential entity class Y should not be empty, but if entity class Y is empty, select the token having an O-tag with the highest entity class Y probability. In applying the rule(s), rule-based processor 216 is capable of analyzing the O-tagged token for a given image of a given domain D to fill the essential entity class Y with the O-tagged token having the highest probability for the respective empty entity class. In one or more example implementations, rule-based processor 216 may only select an O-tagged token for an empty, essential entity class Y in response to determining that the probability of the O-tagged token exceeds a threshold. The threshold applied may be domain and/or entity class-specific. In one or more example implementations, rules applied by rule-based processor 216 may be determined from mining domain-specific training data. In one or more other example implementations, the rules applied by rule-based processor 216 may be specified by a domain expert. In any case, rule-based processor 216 is capable of outputting entities 104 for image 106. Each of entities 104 may have a particular entity class ascribed thereto. Device 100 may present entities 104 to the user via a display through an interface asking the user whether to take further action using entities 104.

Figure 3:
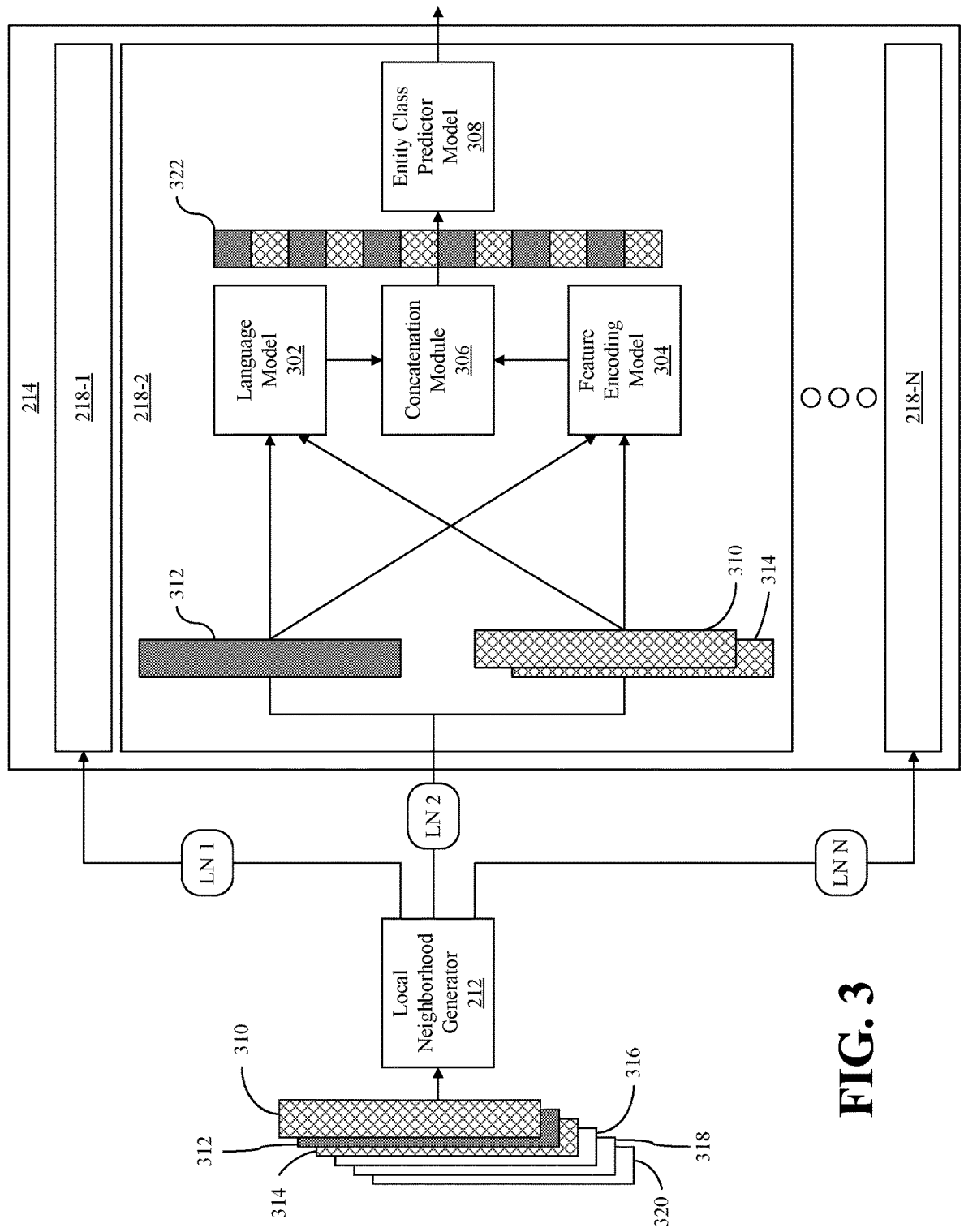
FIG. 3 illustrates an example implementation of local neighborhood processing described in connection with FIG. 2.

FIG. 3 illustrates an example implementation of local neighborhood processing 214 described in connection with FIG. 2. Local neighborhood processing 214 includes a plurality of block prediction pipelines 218-1 through 218-N. As discussed, the value of N may equal the number of blocks ultimately generated from image 106. Accordingly, knowledge extraction system 102 is capable of instantiating one block prediction pipeline 218 for each block determined from image 106. Thus, the number of block prediction pipelines 218 may vary from one image to another.

As shown, local neighborhood generator 212 outputs a local neighborhood to each block prediction pipeline 218 in parallel thereby enabling parallel operation of block prediction pipelines 218. Each block prediction pipeline 218 processes one of the local neighborhoods generated from image 106. For example, block prediction pipeline 218-1 processes local neighborhood 1 (depicted as LN 1 in FIG. 3). Block prediction pipeline 218-2 processes local neighborhood 2 (depicted as LN 2 in FIG. 3). Block prediction pipeline 218-N processes local neighborhood N (depicted as LN N in FIG. 3).

In the example of FIG. 3, local neighborhood generator 212 is capable of receiving blocks 310, 312, 314, 316, 318, and 320. As discussed, each block includes a portion of text and a sub-image of the image undergoing processing, e.g., image 106. For purposes of illustration, block 310 may correspond to text 110, block 312 to text 112, block 314 to text 114, block 316 to text 116, block 318 to text 118, and block 320 to text 120. Thus, block 310 may include the text "8:09 PM" and a sub-image corresponding to the region of image 106 included in the dashed line bounding the subject text. Block 310 may include additional features such as the location of block 310 within image 106 and/or the size of the sub-image.

Local neighborhood generator 212 is capable of generating a plurality of local neighborhoods from a set of blocks extracted from an image. For purposes of illustration, with 6 blocks 310, 312, 314, 316, 318, and 320 having been extracted from the image, local neighborhood generator 212 generates 6 local neighborhoods. Each local neighborhood corresponds to one of blocks 310-320 and is provided to a different one of block prediction pipelines 218. For example, local neighborhood generator 212 is capable of generating local neighborhood 1 for current block 310 that is provided to block prediction pipeline 218-1, local neighborhood 2 for current block 312 that is provided to block prediction pipeline 218-2, and so on.

For purposes of illustration, creation and processing of local neighborhood 2 is shown in FIG. 3. Local neighborhood 2 includes blocks 310, 312, and 314 (e.g., the 3 shaded blocks). In local neighborhood 2, block 312 is the current block, while blocks 310 and 314 are the neighbor blocks. Local neighborhood generator 212 provides local neighborhood 2 comprised of blocks 310, 312, and 314 to language model 302 and to feature encoding model 304.

Language model 302 may be implemented as a pretrained language model. Language model 302 is also a domain-specific language model. In one aspect, language model is a contextual language model. For example, language model 302 may be implemented as a deep neural network language model such as ELMo, BERT (Bidirectional Encoder Representations from Transformers), or GPT (Generative Pre-trained Transformer). Using a pre-trained contextual language model (and tokenizer) avoids having to store a large dictionary of word-embeddings on-device. Language model 302 is capable of encoding text input vectors from the blocks. Language model 302 is capable of encoding the text portions of blocks 310, 312, and 314 into the vector space.

Feature encoding model 304 is capable of detecting and encoding visual features from each of blocks 310, 312, and 314. Feature encoding model 304 may be implemented as a pretrained model that is domain-specific. In an example implementation, feature encoding model 304 may be implemented as a pretrained neural network. Examples of visual features that may be detected and encoded by feature encoding model 304 may include, but are not limited to, font, font size, font color, and location of the text encapsulated by each block. Feature encoding model 304 is capable of encoding visual features of blocks 310, 312, and 314 into the vector space.

Concatenation module 306 is capable of concatenating the textual and visual features at the token level. The textual information of a block may include a plurality of tokens, where each token may correspond to a word. In the examples of FIGS. 2 and 3, the architectures shown operate on local neighborhoods as opposed to a global context for image 106. That is, the architectures of FIGS. 2 and 3 operate on local neighborhoods and not the entirety of image 106 at one time. Because the encoding, as performed by language model 302 and feature encoding model 304, and the concatenation, as performed by concatenation module 306, may be performed in parallel, entity recognition may be performed at the block level in parallel. Such parallel operation is possible since data for a given block is not dependent on an operation that requires computation in a global context (e.g., does not require computation on the entirety of image 106). The context used by each block prediction pipeline is that of the local neighborhood being processed.

For each block $B^i$, concatenation module 306 obtains the neighborhood textual and visual context (textual information and visual information) and concatenates all encoded parts together at the token level to feed into entity class predictor model 308. For purposes of illustration, t represents a text token; f represents visual features such as size, font, location, and/or other visual features described herein; | represents concatenation; and bolding represents an encoded vector. Thus, for an input token x, the vector representation is x and the concatenation is |. The current block may be represented as $B^c=[t_1^c, t_2^c, \ldots t_n^c]$. A neighbor block i of the current block may be represented as $B^i=[t_1^i, t_2^i, \ldots t_n^i]$. A neighbor block feature may be represented as $B_F^i=[f_1^i, f_2^i, \ldots f_m^i]$. For a neighborhood of size 2 and a current block $B^c$, the neighbor text context is $B_N^c=[B^{c-1}|B^{c+1}]$. The combined neighborhood features of $B_F^c=[B_F^{c-1}|B_F^c|B_F^{c+1}]$.

In an example implementation where language model 302 is implemented as a small, pretrained BERT language model, language model 302 is capable of encoding the tokens of the local neighborhood into a single vector using $func1(B_N^c)=[N_F^c]$. Feature encoding model 304 is capable of encoding the visual features using a small, separate network that generates a single vector using $func2(B_F^c)=[F_f^c]$. Concatenation module 306 is capable of generating an output that is provided to entity class predictor model 308. Concatenation module 306 is capable of concatenating together all the encoded parts and into a vector 322. An example of vector 322 may be $[t_1^c|N_f^c|F_f^c, t_2^c|N_f^c|F_f^c, t_n^c|N_f^c|F_f^c]$.

Concatenator 306 outputs vector 322 to entity class predictor model 308. In an example implementation, entity class predictor model 308 is implemented as a final entity class prediction layer. Entity class predictor model 308 also may be domain-specific. Entity class predictor model 308, based on vector 322, outputs the most likely entity class for block 312. That is, entity class predictor model 308 is capable of outputting the entity class having the highest probability for block 312.

Being domain-specific, entity class predictor model 308 is capable of recognizing domain-specific entity classes such as event title, location, time, price, etc., for a given block based on the textual information and the visual features of the current block and the neighbor block(s) in the local neighborhood. Entity class predictor model 308 may be fine-tuned from a small contextual embedding model that is pre-trained on a large language corpus.

Figure 4:
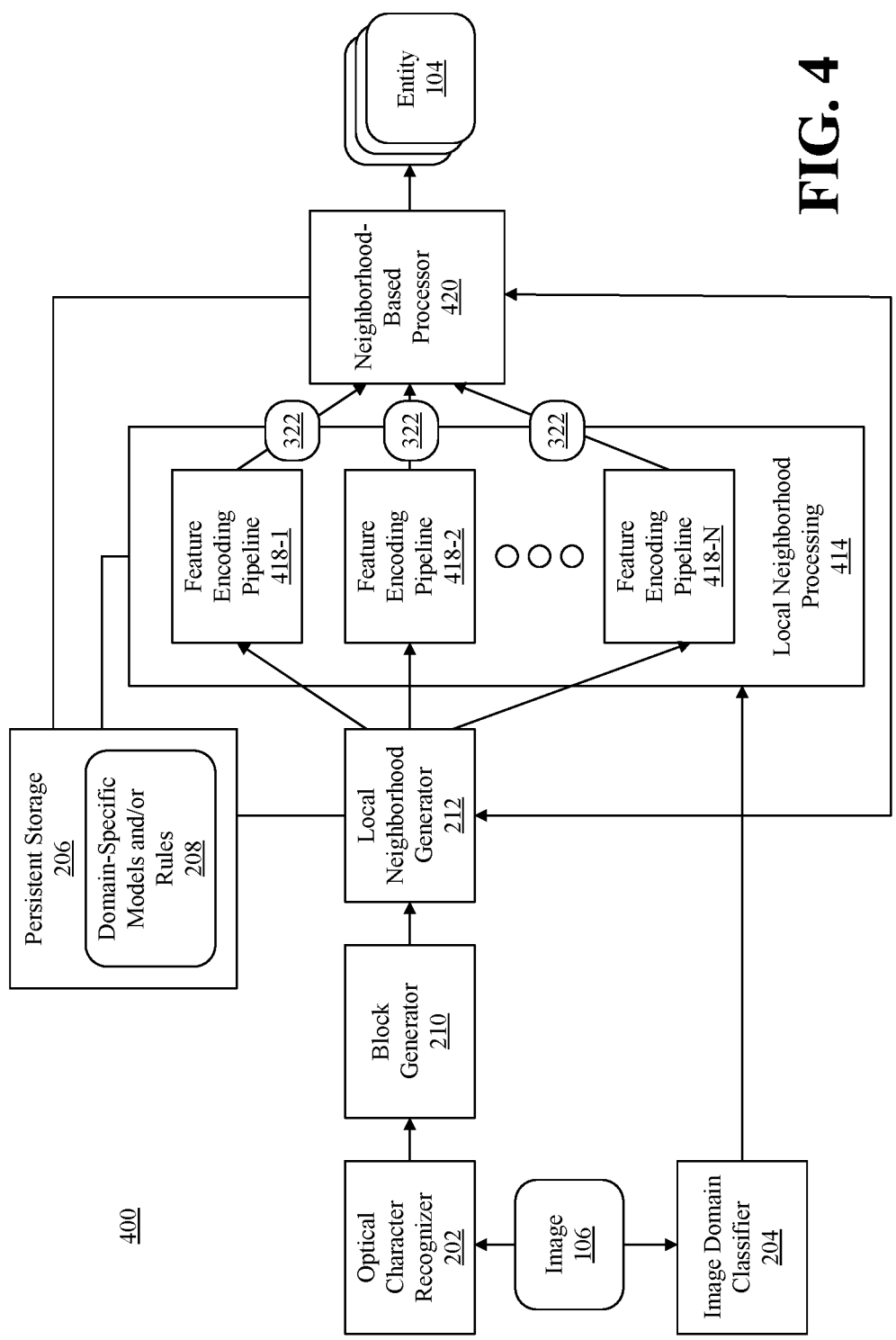
FIG. 4 illustrates another example architecture for a knowledge extraction system configured to extract knowledge from an unstructured data source.

FIG. 4 illustrates another example architecture 400 for a knowledge extraction system configured to extract knowledge from an unstructured data source. Architecture 400 may be used to implement system 102 of FIG. 1. Architecture 400 is substantially similar to the example of FIG. 2. In the example of FIG. 4, local neighborhood processing 214 is replaced with local neighborhood processing 414. Local neighborhood processing 414 includes a plurality of feature encoding pipelines 418. Each feature encoding pipeline 418 processes one or more blocks extracted from image 106, e.g., a local neighborhood, for parallel operation as described in connection to FIG. 2. Knowledge extraction system 102 is capable of instantiating N feature encoding pipelines 418 that operate in parallel. The number of feature encoding pipelines 418 instantiated may vary based on the number of blocks generated from the image being processed. In the example of FIG. 4, unlike that of FIG. 2 where the entity class with the highest probability is output from each of block prediction pipeline, each feature encoding pipeline 418 outputs the entire vector 322 that is determined by the respective feature encoding pipeline 418.

Neighborhood-based processor 420 operates on the vector received from each feature encoding pipeline 418. Rather than perform the final rule inferencing on the individual entity classes, as described in connection with FIG. 2, neighborhood-based processor 420 is capable of considering all of the vectors generated by feature encoding pipelines 418 collectively. For example, neighborhood-based processor 420 is capable of operating on a global basis across all of the vectors to classify each block to a particular entity class. Neighborhood-based processor 420 is capable of analyzing each of the received vectors to select which of the vectors corresponds to a given entity class, e.g., a title, a date, etc. Neighborhood-based processor 420 effectively predicts entity classes by analyzing predictions across the other blocks and then making a final determination for each block. Neighborhood-based processor 420 may further apply rule-based processing as previously described. In the case of FIG. 4, the rule-based processing is applied subsequent to the neighborhood-based entity prediction described.

Neighborhood-based processor 420 may be implemented as a domain-specific model that is pretrained as described. Further, any rule(s) applied by neighborhood-based processor 420 may be domain-specific rules. Such models and/or rules may be loaded in response to determination of the domain of the document.

Figure 5:
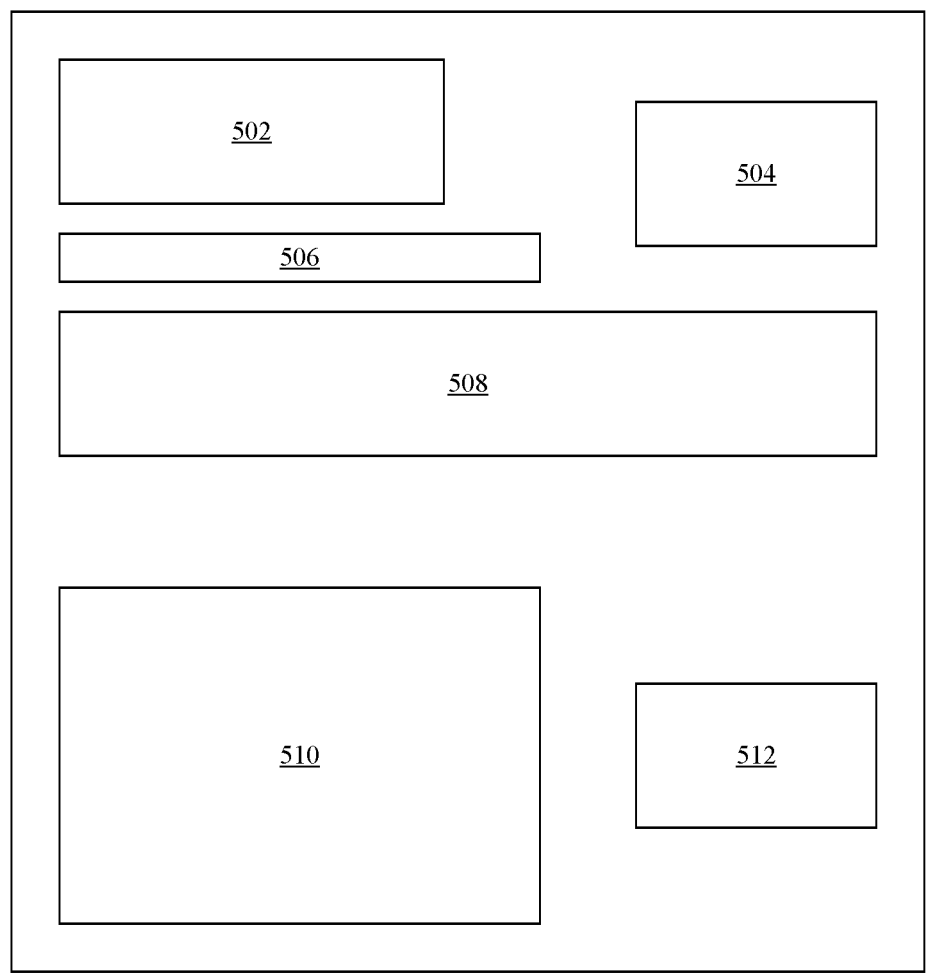
FIG. 5 illustrates an example of local neighborhood generation in accordance with the inventive arrangements.

FIG. 5 illustrates an example of local neighborhood generation in accordance with the inventive arrangements. FIG. 5 illustrates local neighborhood generation as may be performed by local neighborhood generator 212.

In the example of FIG. 5, image 500 has undergone optical character recognition and segment generation to form blocks 502, 504, 506, 508, 510, and 512. Each of blocks 502-512 includes textual information (e.g., recognized text) and visual information corresponding to font, font size, font color, etc. In an example implementation, local neighborhoods may be formed by scanning a window from top to bottom of image 500 to capture, at most, the nearest n blocks to the current block selected for local neighborhood generation. The local neighborhood generated includes the current block and a maximum of the n nearest blocks or "neighbor blocks." In this regard, the window is defined in terms of the n nearest blocks relative to the current block and not in terms of a fixed width or height.

For purposes of illustration, consider an example implementation where the local neighborhood is be formed of at most a predetermined number of blocks r above the current block and at most a predetermined number of blocks s below the current block where. Thus, each local neighborhood includes at most n blocks where r+s≤n. For example, if n=4, the local neighborhood of a current block may, in the general case, include 2 blocks above the current block and 2 blocks below the current block. In some cases, as discussed below, local neighborhoods include fewer than n neighbor blocks. In other example implementations, the local neighborhood may be defined to include the current block, a particular number of blocks to the left of the current block, a particular number of blocks to the right of the current block, a particular number of blocks above the current block, and/or a particular number of blocks below the current block, where the sum of the number of blocks above, left, right, and below the current block does not exceed n.

For purposes of illustration, consider an example where local neighborhoods are formed by sliding a window from the top of image 500 to the bottom. Each local neighborhood is to include n neighbor blocks. In this example, n=4. Each local neighborhood includes a current block, at most 2 blocks above the current block, and at most 2 blocks below the current block. As the window first descends, the first current block is block 502. There are no neighbor blocks above block 502. There are neighbor blocks below current block 502 with the nearest two being blocks 504 and 506. Accordingly, local neighborhood generator 212 generates a local neighborhood for current block 502 that includes current block 502 and neighbor blocks 504 and 506.

The second current block is block 504. The local neighborhood for current block 504 includes 1 block, e.g., block 502, above and 2 blocks, e.g., blocks 506 and 508, below. Accordingly, local neighborhood generator 212 generates a local neighborhood for current block 504 that includes current block 504 and neighbor blocks 502, 506, and 508.

The third current block is block 506. The local neighborhood for current block 506 includes 2 blocks, e.g., blocks 502 and 504, above the current block and 2 blocks, e.g., blocks 508 and 510 below the current block. Accordingly, local neighborhood generator 212 generates a local neighborhood for current block 506 that includes current block 506 and neighbor blocks 502, 504, 508, and 510.

Local neighborhood generator 212 continues to create a local neighborhood for each block of image 500. Appreciably, as the window starts to move down image 500 toward the bottom, the local neighborhoods for other current blocks may have fewer or no neighbor blocks below the current block.

In the example of FIG. 5, local neighborhoods are formed by selecting the n nearest neighbor blocks of the current block. The actual distance between blocks is not considered for purposes of forming local neighborhoods. The actual distance, however, may be considered for purposes of entity class prediction as such visual information is encoded as visual feature data in the resulting feature vector(s).

In one or more example implementations, the value of n may be domain-specific and/or data set specific. As such, the value of n may vary based on the particular domain that is determined for image 106 by image domain classifier 204. In another example implementation, n is a hyper-parameter that may be learned automatically using a machine learning model and a validation dataset. The local neighborhoods provide knowledge extraction system 102 with a way of obtaining an understanding of the area surrounding the current block. The local neighborhoods allow entity class predictor model 308 and/or neighborhood-based processor 420 to more accurately determine the entity class of the blocks. For example, certain domains such as posters may have location and time details followed by the title within a predetermined distance or proximity of the location and/or time details. Local neighborhoods are capable of capturing this in an efficient and sufficient context to so that entity class predictor model 308 and/or neighborhood-based processor 420 may more accurately determine the entity class of the current block.

FIG. 6 illustrates an example method 600 of knowledge extraction from an unstructured data source. Method 600 may be performed by a device including a knowledge extraction system as described herein (collectively "the system"). Method 600 may be performed locally by the device. As such, the device does not access any other devices or systems to perform the operations described. Any domain-specific data used for purposes of classification, encoding, prediction of entity classes, and/or rule-based processing may be predetermined and stored locally on the device.

In block 602, the system optionally retrieves an image from a memory of the device. The image may have been captured by a camera and/or optical sensor of the device, may be a screenshot generated by the device, or may have been received from another device. The image may be stored in non-volatile memory (e.g., a bulk storage device) and retrieved, or fetched, to runtime memory.

In another example implementation, the image may have been captured as a live image and stored in runtime memory. The image may not yet have been stored in non-volatile memory. In the latter case, the image may be selected within the runtime memory for processing.

In block 604, the system is capable of segmenting the image into a plurality of blocks, wherein each block includes textual information from the image. For example, the system is capable of performing optical character recognition on the image to recognize text contained therein and generating a plurality of blocks based on the optical character recognition. Each block may contain a portion of text (e.g., textual information) and a sub-image or region of the image (e.g., visual information that may be extracted). Blocks may include additional visual information created from the block generation process. Such information may include location of the block within the image and/or size of the block.

In block 606, the system is capable of optionally determining a domain for the image. The system further determines domain-specific data for the image that is used by the system for purposes of extracting entities from the image. For example, the system is capable of determining, or selecting, one or more domain-specific parameters, one or more domain-specific models, and/or one or more domain-specific rules. The system is capable of loading such domain-specific data from non-volatile memory into runtime memory for usage and/or execution. In an example implementation, the system implements blocks 604 and 606 in parallel such that blocks 604 and 606 may be performed concurrently.

In one example, in response to determining the domain of the image, the system is capable of determining a number (e.g., n) of the one or more neighboring blocks to be used in creating a local neighborhood for each block based on the domain. Accordingly, in response to determining the domain of the image, the value of n, e.g., a parameter of the local neighborhood generator, may be set in response to determining the domain of the image.

In another example implementation, in response to determining the domain of the image, the system is capable of selecting the entity class prediction model that is specific to the determined domain of the image. Accordingly, in response to determining the domain of the image, the system further is capable of loading the selected entity class prediction model into runtime memory from non-volatile memory. In one aspect, an entity class prediction model is included in each of block prediction pipelines 218. In another aspect, the entity class prediction model is implemented post feature encoding pipelines 418, e.g., as part of neighborhood-based processor 420.

In another example implementation, in response to determining the domain of the image, the system is capable of selecting a contextual language model that is specific to the determined domain of the image. Accordingly, in response to determining the domain of the image, the system further is capable of loading the selected contextual language model into runtime memory from nonvolatile memory. The selected contextual language model may be included in each block prediction pipeline 218 and/or each feature encoding pipeline 418.

In another example implementation, in response to determining the domain of the image, the system is capable of selecting a feature encoding model that is specific to the determined domain of the image. Accordingly, in response to determining the domain of the image, the system further is capable of loading the selected feature encoding model into runtime memory from nonvolatile memory. The selected feature encoding model may be included in each block prediction pipeline 218 and/or each feature encoding pipeline 418.

In another example implementation, in response to determining the domain of the image, the system is capable of selecting one or more domain-specific rules for use in rule-based processing performed by rule-based processor 216 and/or neighborhood-based processor 420. Accordingly, in response to determining the domain of the image, the system further is capable of loading the selected feature encoding model into runtime memory from nonvolatile memory.

Blocks 608 and 610 illustrate example operations performed on local neighborhoods. As discussed, local neighborhoods of blocks from the image may be generated. In one aspect, the number of neighbor blocks included in a given local neighborhood for a current block is determined based on the domain determined for the image.

In block 608, the system is capable of generating encoded feature data by encoding the visual information of the block and the visual information of one or more neighboring blocks from the plurality of blocks. Visual information may include font, font size, font color, location, block size, and the like. The system may encode the visual information using a feature encoding model. As noted, the feature encoding model may be domain-specific. In block 610, the system is capable of generating encoded textual data by encoding the textual information of the block and the textual information of the one or more neighboring blocks. The system is capable of generating the textual information using a contextual language model. The contextual language model may be domain-specific.

In one aspect, the operations described in connection with blocks 608 and 610 may be performed concurrently and in parallel for each local neighborhood for the image. The system may execute a feature encoder and a contextual language model in parallel in each respective pipeline to perform the respective encoding operations concurrently for a given local neighborhood.

In an example implementation, the system is capable of combining the encoded textual data and the encoded feature data by concatenating the data on a per token basis. The resulting concatenated data may be provided to a next stage of the system for purposes of entity classification.

In an example implementation, each block prediction pipeline 218 as described in connection with FIG. 2 is capable of outputting a prediction of the entity class for the block having the highest probability. The entity class with the highest probability from each block prediction pipeline 218 may be provided to rule-based processor 216 for further domain-specific rule-based processing as described herein.

In another example implementation, each feature encoding pipeline 418 as described in connection with FIG. 4 is capable of outputting a vector of predicted entity classes for the block with the corresponding probabilities. Neighborhood-based processor 420 is capable of processing the vector received from each feature encoding pipeline 418 to determine a likely entity class for each block based upon the plurality of vectors provided from local neighborhood processing 414. Neighborhood-based processor 420 may also perform domain-specific rule-based processing as described herein.

In block 612, the system is capable of classifying, using an entity class prediction model, the block into one or more entity classes based on a combination of the encoded textual data and the encoded feature data. The system may perform the classification for each block.

In one or more example implementations, the generating the encoded feature data (e.g., block 608), the generating the encoded textual data (e.g., block 610), and the classifying (612) may be performed for the plurality of local neighborhoods in parallel. For example, the system may create or instantiate one processing pipeline for each local neighborhood of blocks generated from the image. Each processing pipeline may operate in parallel concurrently with the other processing pipelines to reduce the amount of time needed to process the local neighborhoods.

In one aspect, as described in connection with FIG. 2, each processing pipeline processes one local neighborhood to determine the most likely entity classes for the tokens in the current block of the local neighborhood being processed. In another aspect, as described in connection with FIG. 4, each processing pipeline processes one local neighborhood to generate a vector specifying a plurality of likely entity classes for the tokens in the current block of the local neighborhood being processed. In the example of FIG. 4, the system is capable of analyzing a class probability distribution of the tokens in the block and the one or more neighboring blocks. The classifying of the tokens in the block is based on the class probability distribution, e.g., the plurality of vectors for the plurality of blocks.

In block 614, the system is capable of extracting a plurality of entities from the image based on the entity classes of the plurality of blocks. For example, the system is capable of outputting one or more entities with the predicted entity class for each block. The entities may be stored in memory within the device as a data structure and may be used by one or more other applications for purposes of automatically creating further objects such as events, calendar entries, messages, reminders, or the like. Once extracted, the entities exist independently of the image from which the entity and/or entities were extracted. The entities, as extracted, are domain-specific entities in that the entity classes are domain-specific.

In one or more example implementations, the system is capable of extracting entities from the image by extracting entity classes corresponding to tokens. For example, for a token having a given entity class, the system extracts that token for the entity class as an entity and continues to extract tokens, in order in the block, and add the tokens to the entity so long as the token(s) are of the same entity class until an end of the string is detected or a start of a token with a different entity class or an O-tag is detected.

In performing the entity extraction, for example, IOB (Inside, Outside, Beginning) tagging notation may be used for purposes of detecting the start and end of a given entity based on the token classifications. An entity extracted from the image may be a single token or a phrase having two or more tokens. For purposes of illustration, consider an example where the text "here at 9 pm sharp" is tagged as follows where the tag follows the token in brackets: here [O] at [O] 9 [b-time] pm [i-time] sharp [O]. In this example, the entity that is extracted is "9 pm" where the token "9" is considered the start of the entity and the token "pm" is considered the end of the entity. A similar process is performed with regard to the other tokens and classes. As an example, a plurality of tokens each interpreted as a location (e.g., an address) may be processed in the same or similar manner as previously described with reference to time tokens.

In one or more example implementations, different domain-specific data may be loaded to process a given image in response to determining the domain of the image. In response to a next image to be processed having a different domain, the system is capable of unloading the domain-specific data for the prior image and loading the domain-specific data for the next image to be processed. As such, domain-specific data may be dynamically loaded and unloaded with respect to runtime memory as needed to process different images based on the domain determined for each respective image. It should be appreciated that the number of pipelines implemented in local neighborhood processing 214 and/or local neighborhood processing 414 differs based on the number of blocks determined from each image. Accordingly, while each pipeline is domain-specific, the number of such pipelines operating in parallel may differ from one image to another despite the images belonging to the same domain.

Figure 7:
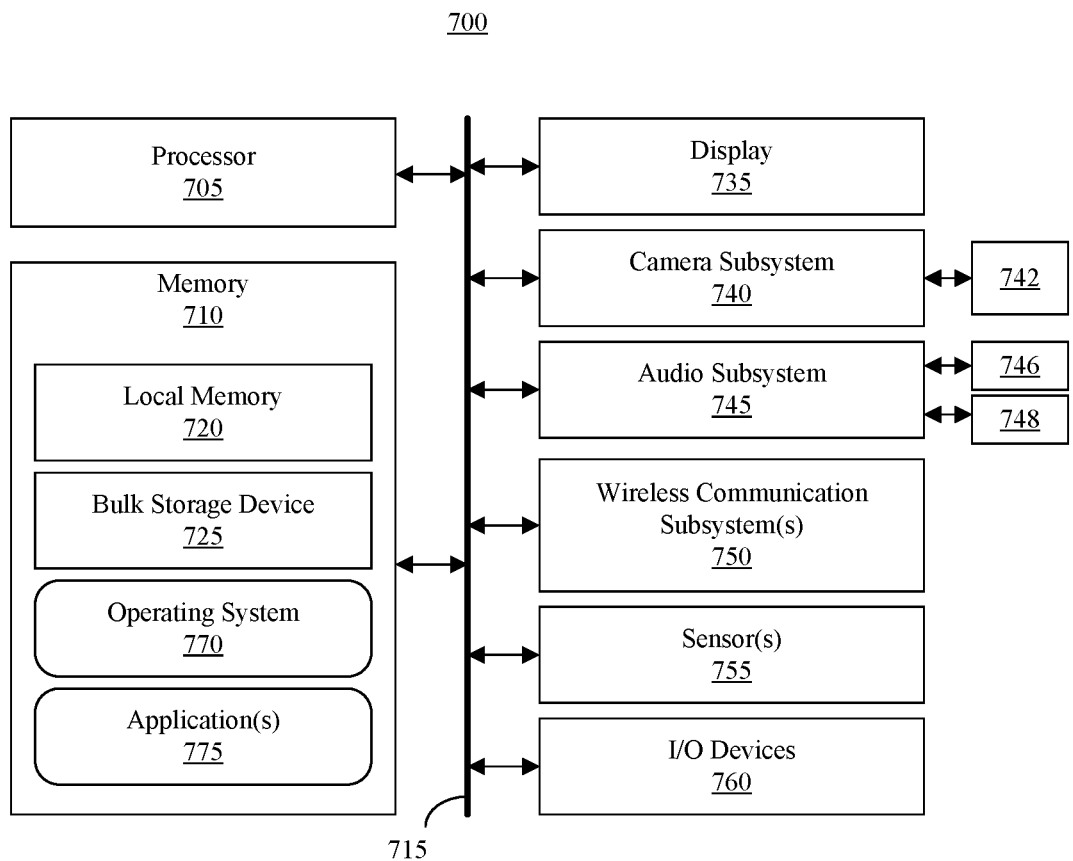
FIG. 7 illustrates an example device configured for operation as a knowledge extraction system.

FIG. 7 illustrates an example device 700 configured for operation as a knowledge extraction system. Device 700 includes at least one processor 705. Processor 705 is coupled to memory 710 through interface circuitry 715. Device 700 stores computer readable instructions (also referred to as "program code") within memory 710. Memory 710 is an example of computer readable storage media. Processor 705 executes the program code accessed from memory 710 via interface circuitry 715.

Memory 710 includes one or more physical memory devices such as, for example, a local memory 720 and a bulk storage device 725. Local memory 720 is implemented as one or more non-persistent memory device(s) generally used during actual execution of the program code. Local memory 720 is an example of a runtime memory. Examples of local memory 720 include any of the various types of RAM suitable for use by a processor for executing program code. Bulk storage device 725 is implemented as a persistent data storage device (e.g., persistent storage 206). Examples of bulk storage device 725 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 700 may also include one or more cache memories (not shown) that provide temporary storage of at least some program code in order to reduce the number of times program code must be retrieved from a bulk storage device during execution.

Examples of interface circuitry 715 include, but are not limited to, an input/output (I/O) subsystem, an I/O interface, a bus system, and a memory interface. For example, interface circuitry 715 may be implemented as any of a variety of bus structures and/or combinations of bus structures including a memory bus or memory controller, a peripheral bus, an accelerated graphics port, and a processor or local bus.

In one or more example implementations, processor 705, memory 710, and/or interface circuitry 715 are implemented as separate components. Processor 705, memory 710, and/or interface circuitry 715 may be integrated in one or more integrated circuits. The various components in device 700, for example, can be coupled by one or more communication buses or signal lines (e.g., interconnects and/or wires). Memory 710 may be coupled to interface circuitry 715 via a memory interface, e.g., a memory controller (not shown).

Device 700 may include one or more displays. In the example of FIG. 7, device 700 includes a display 735 (e.g., a screen). Display 735 may be implemented as a touch-sensitive or touchscreen display capable of receiving touch input from a user. A touch sensitive display and/or a touch-sensitive pad is capable of detecting contact, movement, gestures, and breaks in contact using any of a variety of available touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 700 may include a camera subsystem 740. Camera subsystem 740 can be coupled to interface circuitry 715 directly or through a suitable input/output (I/O) controller. Camera subsystem 740 can be coupled to an optical sensor 742. Optical sensor 742 may be implemented using any of a variety of technologies. Examples of optical sensor 742 can include, but are not limited to, a charged coupled device (CCD) or a complementary metal-oxide semiconductor (CMOS) optical sensor. Camera subsystem 740 and optical sensor 742 are capable of performing camera functions such as recording or capturing images and/or recording video.

Device 700 may include an audio subsystem 745. Audio subsystem 745 can be coupled to interface circuitry 715 directly or through a suitable input/output (I/O) controller. Audio subsystem 745 can be coupled to a speaker 746 and a microphone 748 to facilitate voice-enabled functions, such as voice recognition, voice replication, digital recording, and telephony functions.

Device 700 may include one or more wireless communication subsystems 750. Each of wireless communication subsystem(s) 750 can be coupled to interface circuitry 715 directly or through a suitable I/O controller (not shown). Each of wireless communication subsystem(s) 750 is capable of facilitating communication functions. Examples of wireless communication subsystems 750 can include, but are not limited to, radio frequency receivers and transmitters, and optical (e.g., infrared) receivers and transmitters. The specific design and implementation of wireless communication subsystem 750 can depend on the particular type of device 700 implemented and/or the communication network(s) over which device 700 is intended to operate.

As an illustrative and non-limiting example, wireless communication subsystem(s) 750 may be designed to operate over one or more mobile networks, WiFi networks, short range wireless networks (e.g., a Bluetooth), and/or any combination of the foregoing. Wireless communication subsystem(s) 750 can implement hosting protocols such that device 700 can be configured as a base station for other wireless devices.

Device 700 may include one or more sensors 755. Each of sensors 755 can be coupled to interface circuitry 715 directly or through a suitable I/O controller (not shown). Examples of sensors 755 that can be included in device 700 include, but are not limited to, a motion sensor, a light sensor, and a proximity sensor to facilitate orientation, lighting, and proximity functions, respectively, of device 700. Other examples of sensors 755 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 700 in 3-dimensions, and an altimeter (e.g., an integrated circuit) capable of providing data indicating altitude.

Device 700 further may include one or more input/output (I/O) devices 760 coupled to interface circuitry 715. I/O devices 760 may be coupled to interface circuitry 715 either directly or through intervening I/O controllers (not shown). Examples of I/O devices 760 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 700 to become coupled to other systems, computer systems, remote printers, and/or remote storage devices through intervening private or public networks. Modems, cable modems, Ethernet interfaces, and wireless transceivers not part of wireless communication subsystem(s) 750 are examples of different types of network adapters that may be used with device 700. One or more of I/O devices 760 may be adapted to control functions of one or more or all of sensors 755 and/or one or more of wireless communication subsystem(s) 750.

Memory 710 stores program code. Examples of program code include, but are not limited to, routines, programs, objects, components, logic, and other data structures. For purposes of illustration, memory 710 stores an operating system 770 and application(s) 775. Application(s) 775 may include an implementation of knowledge extraction system 102 as described within this disclosure. Knowledge extraction system 102, when executed by processor 705, is capable of causing device 700 to perform the various operations described herein. For example, knowledge extraction system 102 is capable of operating on an image stored in memory 710. The image may be captured by camera subsystem 740 and optical sensor 742.

In an aspect, operating system 770 and application(s) 775, being implemented in the form of executable program code, are executed by device 700 and, more particularly, by processor 705, to perform the operations described within this disclosure. As such, operating system 770 and application(s) 775 may be considered an integrated part of device 700. Further, it should be appreciated that any data and/or program code used, generated, and/or operated upon by device 700 (e.g., processor 705) are functional data structures that impart functionality when employed as part of device 700.

Device 700 is provided for purposes of illustration and not limitation. A device and/or system configured to perform the operations described herein may have a different architecture than illustrated in FIG. 7. The architecture may be a simplified version of the architecture described in connection with FIG. 7 that includes a memory capable of storing instructions and a processor capable of executing instructions. In this regard, device 700 may include fewer components than shown or additional components not illustrated in FIG. 7 depending upon the particular type of device that is implemented. In addition, the particular operating system and/or application(s) included may vary according to device type as may the types of I/O devices included. Further, one or more of the illustrative components may be incorporated into, or otherwise form a portion of, another component. For example, a processor may include at least some memory.

Device 700 may be implemented as a data processing system, a communication device, or other suitable system that is suitable for storing and/or executing program code. Device 700 may be implemented as an edge device. Example implementations of device 700 may include, but are not to limited to, a smart phone or other mobile device or phone, or a wearable computing device. In other example implementations, though knowledge extraction system 102 may be implemented in an edge device, knowledge extraction system 102 may also be implemented in other computing devices such as a computer (e.g., desktop, laptop, or tablet computer), a television or other appliance with a display, a computer system included and/or embedded in another larger system such as an automobile, a virtual reality system, or an augmented reality system.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

The term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the present invention. Within this disclosure, the term "program code" is used interchangeably with the term "computer readable program instructions."

Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-based method for understanding content from images, comprising:
    recognizing text in an image;
    segmenting the image into a plurality of blocks, wherein each block includes a portion of the text of the image as recognized and a sub-image that is a cropped portion of the image that includes the portion of text of the block;
    for each block of the plurality of blocks, forming a local neighborhood including a current block and one or more neighboring blocks from the plurality of blocks;
    for each local neighborhood:
        for each block of the local neighborhood, generating encoded feature data by encoding visual information from the block inclusive of the sub-image of the block, wherein the visual information includes font data for text included in the sub-image;

for each block of the local neighborhood, generating encoded textual data by encoding the portions of text from the block;

concatenating the encoded feature data and the encoded textual data for each block of the local neighborhood into a concatenated vector for the local neighborhood; and classifying, using an entity class prediction model, the current block of the local neighborhood into one or more entity classes based on the concatenated vector of the local neighborhood; and extracting a plurality of entities from the image based on the entity classes of the plurality of blocks.

2. The method of claim 1, further comprising:

determining a domain of the image by processing the image through an image domain classifier, wherein the domain specifies a document type for the image; and wherein a number of the neighboring blocks included in each local neighborhood is variable based on the domain of the image, and wherein the neighboring blocks are blocks nearest to the current block in the image.

3. The method of claim 1, further comprising:

determining a domain of the image by processing the image through an image domain classifier, wherein the domain specifies a document type for the image; and in response to the determining the domain, selecting the entity class prediction model from a plurality of entity class prediction models stored in non-volatile memory based on the domain of the image, wherein the entity class prediction model is specific to the domain, and loading the entity class prediction model as selected into runtime memory.

4. The method of claim 1, further comprising:

determining a domain of the image by processing the image through an image domain classifier, wherein the domain specifies a document type for the image; and in response to the determining the domain, selecting a contextual language model from a plurality of contextual language models stored in non-volatile memory based on the domain of the image, wherein the contextual language model is specific to the domain, and loading the contextual language model as selected into runtime memory for use in the generating the encoded textual data.

5. The method of claim 1, further comprising:

determining a domain of the image by processing the image through an image domain classifier, wherein the domain specifies a document type for the image; and in response to the determining the domain, selecting a feature encoding model from a plurality of feature encoding models stored in non-volatile memory based on the domain of the image, wherein the feature encoding model is specific to the domain, and loading the feature encoding model as selected for use in the generating the encoded feature data.

6. The method of claim 1, wherein the generating the encoded feature data, the generating the encoded textual data, and the classifying of the current block are performed in parallel for the local neighborhoods.

7. The method of claim 1, wherein the font data includes at least one of a font, a font size, or a font color.

8. The method of claim 1, wherein the encoded feature data includes a size of the sub-image and a location.

9. The method of claim 1, wherein the classifying is performed for each block of the plurality of blocks on a global basis based on the concatenated vector of each local neighborhood of the image.

10. A system for understanding content from images, comprising:

a processor configured to initiate operations including:

recognizing text in an image;

segmenting the image into a plurality of blocks, wherein each block includes a portion of the text of the image as recognized and a sub-image that is a cropped portion of the image that includes the portion of text of the block;

for each block of the plurality of blocks, forming a local neighborhood including a current block and one or more neighboring blocks from the plurality of blocks;

for each local neighborhood:

for each block of the local neighborhood, generating encoded feature data by encoding visual information from the block inclusive of the sub-image of the block, wherein the visual information includes font data for text included in the sub-image;

for each block of the local neighborhood, generating encoded textual data by encoding the portions of text from the block;

concatenating the encoded feature data and the encoded textual data for each block of the local neighborhood into a concatenated vector for the local neighborhood; and classifying, using an entity class prediction model, the current block of the local neighborhood into one or more entity classes based on the concatenated vector; and extracting a plurality of entities from the image based on the entity classes of the plurality of blocks.

11. The system of claim 10, wherein the processor is configured to initiate operations comprising:

determining a domain of the image by processing the image through an image domain classifier, wherein the domain specifies a document type for the image; and wherein a number of the neighboring blocks included in each local neighborhood is variable based on the domain of the image, and wherein the neighboring blocks are nearest to the current block in the image.

12. The system of claim 10, wherein the processor is configured to initiate operations comprising:

determining a domain of the image by processing the image through an image domain classifier, wherein the domain specifies a document type for the image; and in response to the determining the domain, selecting the entity class prediction model from a plurality of entity class prediction models stored in non-volatile memory based on the domain of the image, wherein the entity class prediction model is specific to the domain, and loading the entity class prediction model as selected into runtime memory.

13. The system of claim 10, wherein the processor is configured to initiate operations comprising:

determining a domain of the image by processing the image through an image domain classifier, wherein the domain specifies a document type for the image; and in response to the determining the domain, selecting a contextual language model from a plurality of contextual language models stored in non-volatile memory based on the domain of the image, wherein the contextual language model is specific to the domain, and loading the contextual language model as selected into runtime memory for use in the generating the encoded textual data.

14. The system of claim 10, further comprising:
determining a domain of the image by processing the image through an image domain classifier, wherein the domain specifies a document type for the image; and
in response to the determining the domain, selecting a feature encoding model from a plurality of feature encoding models stored in non-volatile memory based on the domain of the image, wherein the feature encoding model is specific to the domain, and loading the feature encoding model as selected for use in the generating the encoded feature data.

15. The system of claim 10, wherein the generating the encoded feature data, the generating the encoded textual data, and the classifying of the current block are performed in parallel for the local neighborhoods.

16. The system of claim 10, wherein the font data includes at least one of a font, a font size, or a font color.

17. The system of claim 10, wherein the encoded feature data includes a size of the sub-image and a location.

18. The system of claim 10,
wherein the classifying is performed for each block of the plurality of blocks on a global basis based on the concatenated vector of each local neighborhood of the image.

19. A computer program product, comprising:
one or more computer readable storage media, and program instructions collectively stored on the one or more computer readable storage media, wherein the program instructions are executable by computer hardware to perform operations including:
recognizing text in an image;
segmenting the image including text into a plurality of blocks, wherein each block includes a portion of the text of the image as recognized and a sub-image that is a cropped portion of the image that includes the portion of text of the block;
for each block of the plurality of blocks, forming a local neighborhood including a current block and one or more neighboring blocks from the plurality of blocks;
for each local neighborhood:
for each block of the local neighborhood, generating encoded feature data by encoding visual information from the block inclusive of the sub-image of the block, wherein the visual information includes font data for text included in the sub-image;
for each block of the local neighborhood, generating encoded textual data by encoding the portions of the text from the block;
concatenating the encoded feature data and the encoded textual data for each block of the local neighborhood into a concatenated vector for the local neighborhood; and
classifying, using an entity class prediction model, the current block of the local neighborhood into one or more entity classes based on the concatenated vector of the local neighborhood; and
extracting a plurality of entities from the image based on the entity classes of the plurality of blocks.

20. The computer program product of claim 19, wherein the program instructions are executable by the computer hardware to initiate operations further comprising:
determining a domain of the image by processing the image through an image domain classifier, wherein the domain specifies a document type for the image; and
wherein at least one of the generating the encoded feature data, the generating the encoded textual data, or the classifying the one or more features of the block is performed by selecting a model that is specific to the domain from a plurality of models in non-volatile memory and loading the model as selected into runtime memory.

* * * * *